(12) United States Patent
Grochowski

(10) Patent No.: US 7,198,767 B1
(45) Date of Patent: Apr. 3, 2007

(54) METHOD FOR TREATING FLUIDS ON BULK MATERIAL

(75) Inventor: Horst Grochowski, Lindnerstrasse 163, D-46149 Oberhausen (DE)

(73) Assignee: Horst Grochowski, Oberhausen (DE)

( * ) Notice: Subject to any disclaimer, the term of this patent is extended or adjusted under 35 U.S.C. 154(b) by 577 days.

(21) Appl. No.: 10/070,723

(22) PCT Filed: Sep. 6, 2000

(86) PCT No.: PCT/EP00/08710

§ 371 (c)(1),
(2), (4) Date: Jun. 19, 2002

(87) PCT Pub. No.: WO01/17663

PCT Pub. Date: Mar. 15, 2001

(30) Foreign Application Priority Data

Sep. 6, 1999 (DE) ................................. 199 42 335
Sep. 6, 1999 (DE) ................................. 199 42 495

(51) Int. Cl.
*B01D 53/56* (2006.01)
(52) U.S. Cl. .................................................. 423/213.2
(58) Field of Classification Search ............. 423/213.2, 423/235
See application file for complete search history.

(56) References Cited

U.S. PATENT DOCUMENTS 4,764,355 A * 8/1988 Romey et al. ......... 423/244.03
5,603,907 A   2/1997 Grochowski
5,897,282 A   4/1999 Comardo

FOREIGN PATENT DOCUMENTS

| DE | 39 10 227 A1 | 10/1990 |
| DE | 39 16 325 A1 | 11/1990 |
| WO | WO 01/17663 A1 | 3/2001 |

OTHER PUBLICATIONS

International Search Report, dated Jan. 18, 2001.
International Preliminary Examination Report, dated Dec. 21, 2001.

* cited by examiner

*Primary Examiner*—Edward M. Johnson
(74) *Attorney, Agent, or Firm*—Fay Sharpe LLP

(57) ABSTRACT

The fluid treatment installation, in particular for cleaning gases on a bulk material in countercurrent with respect to the movement of the bulk material, is characterized in that adjacent bulk material beds are interconnected by a shared horizontal charging channel and a bulk material delivery container can be moved through the charging channel between a charging position and several bulk material portion delivery positions above the bulk material beds. Several bulk material beds can be interconnected by a shared horizontal discharge channel, where a bulk material reception container can be moved through the discharge channel between the bulk material portion exchange positions (bulk material portion reception positions) and at least one bulk material delivery position below the bulk material beds.

18 Claims, 7 Drawing Sheets

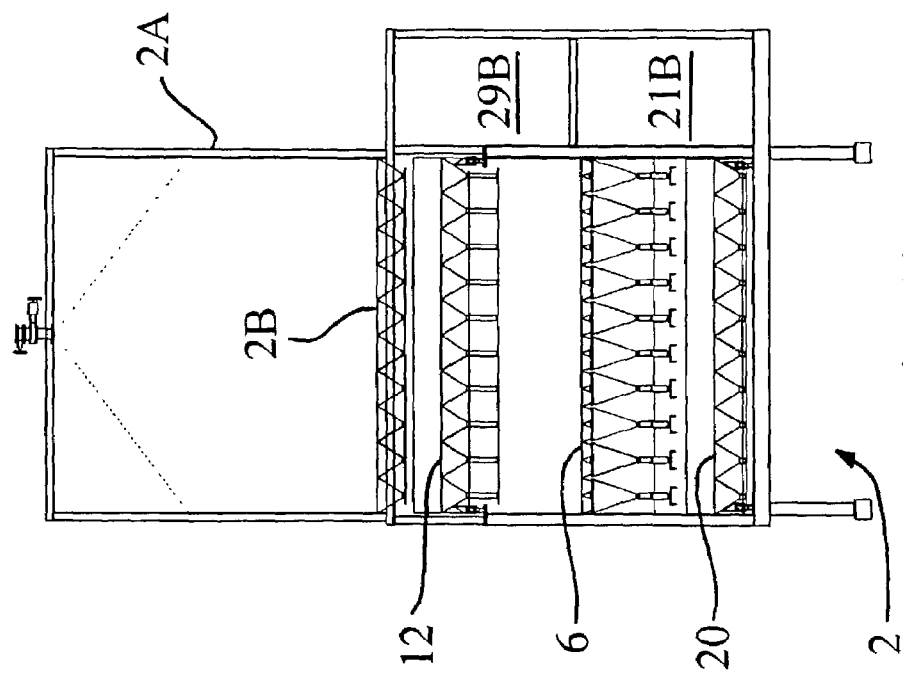
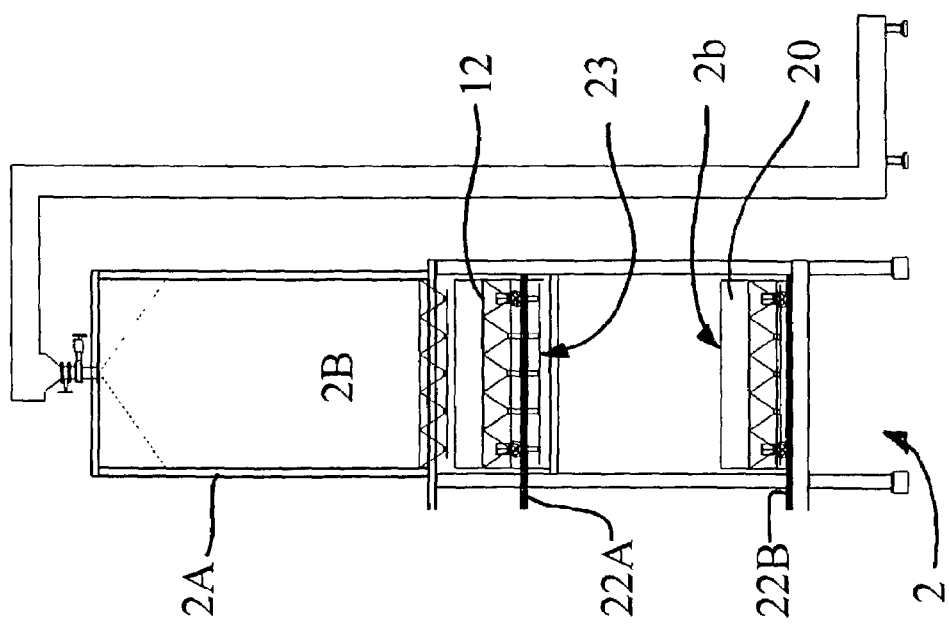
Fig. 2b
Fig. 1b

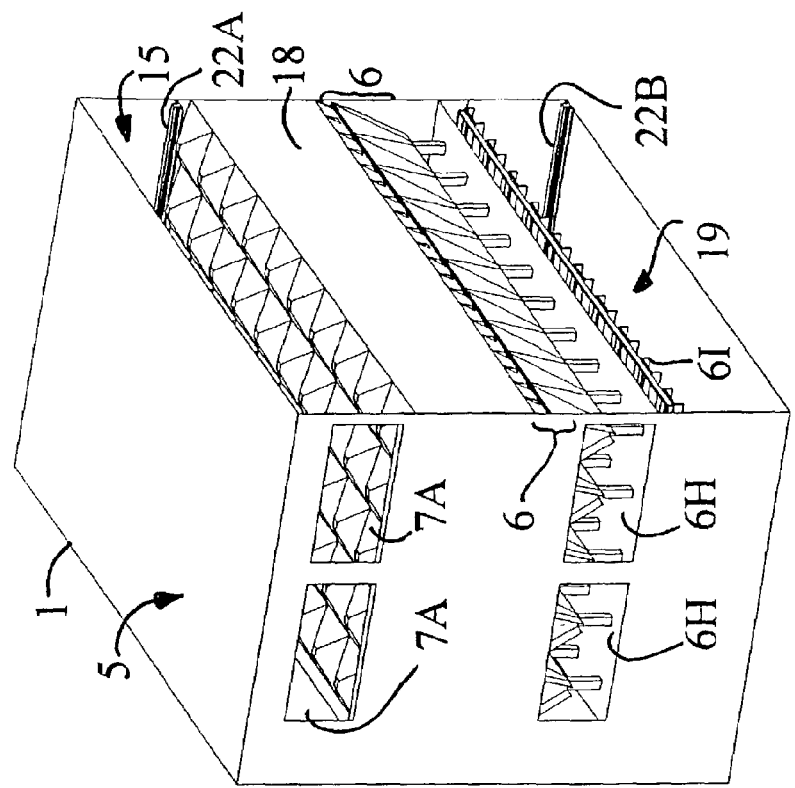
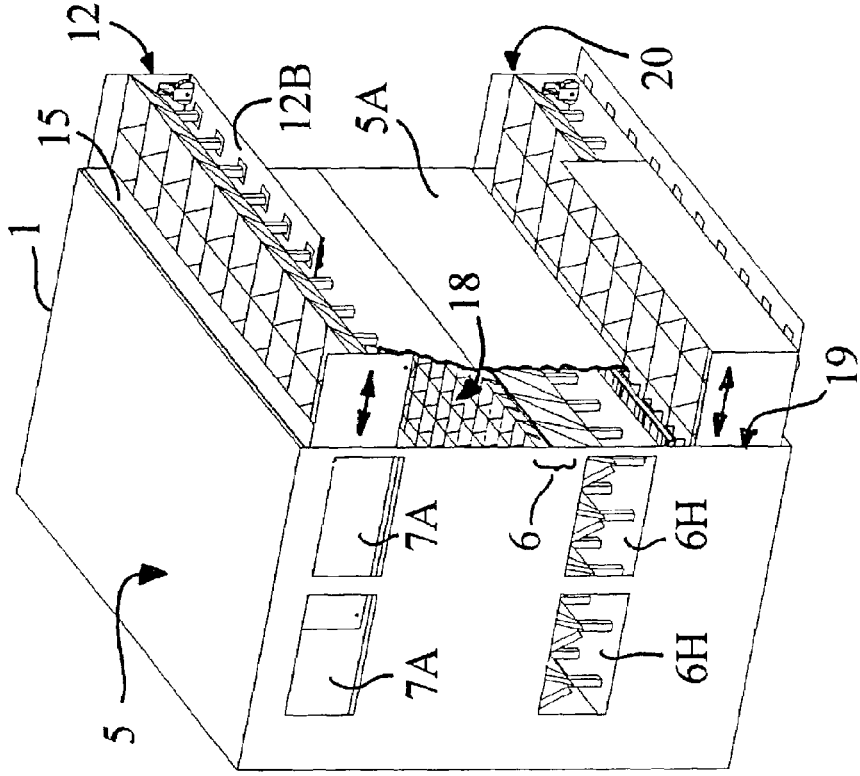
Fig. 6b
Fig. 6a

METHOD FOR TREATING FLUIDS ON BULK MATERIAL

The invention relates to a method for treating, in particular cleaning, fluids as well as a charging device and a gas treatment installation to carry out the method.

BACKGROUND OF THE INVENTION

In installations for treating large quantities of gas, produced, for example, as waste gas in combustion processes, in particular for removing environmentally polluting compounds, such as dioxins, furans, sulfur compounds, chlorine compounds, nitrogen compounds, hydrocarbons, heavy metals and/or other components, on a bulk material, one substantial problem consists of the large surface area of the bulk material layer, which is occasionally also referred to as "filter." Indeed, it is desirable to keep the resistance to flow through the bulk material layer small, while at the same time ensuring a consistent high treatment quality throughout the entire filter cross section. To achieve this, the bulk material, if it is to be used in countercurrent with respect to the fluid to be treated, which is a particularly effective method, must be repeatedly and evenly removed at the floor of the bulk material layer, the feed inlet floor, while fresh bulk material is delivered evenly distributed over the surface of the bed, in a bulk material portion exchange. This problem has been solved on a large industrial scale by means of so-called moving bed reactors, as described in the Patents WO 88/08746, WO 91/12069 and EP 0 472 565.

With these known methods, devices and installations, the bulk material is supplied through bulk material reservoir bin and bulk material distribution floors, which are arranged immediately above each bulk material bed. The bulk material unloading openings of the bulk material distribution floors consist of permanently open pipe mouths, where a cone of bulk material forms under each mouth. Since these mouth openings are evenly distributed over the bed cross section, the bulk material bed surface consists of a multitude of such bulk material cones. The space which necessarily remains between the bulk material bed surface and the bulk material distribution floor of each bed acts as a gas collecting space, which space is connected via a closable opening in the lateral wall of the container (reactor) which receives the bulk material bed with a gas collection or exhaust channel, into which the combined waste gas streams of all the beds flow. As a result of the permanently open mouth or discharge openings of the bulk material distribution floor, the fluid to be treated can also penetrate into the bulk material reservoir bin. Therefore, special steps must be taken so that the refill openings of the bulk material reservoir bin are always closed with sufficient seal and that any treated gases which penetrate into the reservoir bin do not cause any undesired reactions in the reservoir bins, for example, as a result of oxygen containing creep flow, so-called hot spots.

An additional problem consists in the fact that the suitability of the available treatment bulk materials is highly variable and, in the case of particularly high concentrations of fluid components to be treated and/or great differences between the fluid components to be treated—it is not sufficient to achieve the desired treatment result in a single processing step.

An additional problem in the mentioned fluid treatment installations consists in the fact that the type of distribution of the bulk material on the reactor beds and/or the application of the bulk material results in a relatively rigid establishment of a predetermined process type in the fluid treatment sequence.

SUMMARY OF THE INVENTION

As a result of the above, the invention is based on the problem of proposing a method, a bulk material delivery device and a gas treatment installation, by which a higher flexibility of the fluid treatment by means of a moving bed reactor filled with bulk material is achieved. Furthermore, it is desirable that the risk of leaks for treated gas above the bulk material bed be reduced.

Since known moving bed reactor installations present a high installation height in comparison to the bed height, a special goal consists in clearly reducing the size of the installation and thus also the cost of the construction of such an installation.

Since, in known moving bed reactor installations, the automatic or semi-automatic refilling from the reservoir bins occurs above the adjacent bulk material beds, for example, via chain bucket conveyors and reservoir bin port holes which can be opened and closed, an additional goal of the invention is to reduce the effort required for the distribution of bulk material on the individual bulk material beds. It is also desirable to reduce the wear due to abrasion which the bulk material undergoes in known bulk material distribution installations; i.e. in general it is desirable to use milder conditions for the fresh bulk material.

Finally, another goal of the invention is to broaden the possibilities of fluid treatment a single treatment step, in particular to create a simplified possibility of treating the fluid on bulk materials with different treatment properties in case the same bulk material layer is used, for example, on the one hand, by adsorption, and, on the other hand, by chemical reaction, as is known for bulk material mixtures made, for example, of activated charcoal or activated coke, on the one hand, and calcium hydroxide, on the other hand, for example, in the entrained stream method, in which bulk materials are finely ground for the formation of an entrainment stream (together with the fluid to be treated).

To solve the problem mentioned above, there is provided a method for treating, in particular cleaning, fluids, in particular gases, on at least one bulk material, in which the fluid substantially flows from the bottom to the top through a bulk material bed and the bulk material moves through the bulk material bed substantially from top to bottom countercurrent to the fluid, and in which, at the bottom end of the bulk material bed, bulk material portions are removed and, at the top end of the bulk material bed, bulk material portions are delivered on the bulk material bed, where several bulk material beds are operated in parallel and, in particular, the bulk material portion exchange in the bulk material beds occurs substantially successively, in which for the bulk material portion exchange for the delivery of bulk material portions onto the bulk material bed, a movable bulk material delivery container is used with a bulk material distribution arrangement for the even distribution in layers of the bulk material over the given bulk material bed with at least one loading opening and at least one closable unloading opening, and the movable bulk material delivery container is loaded in at least one charging position with bulk material, and the bulk material delivery container is moved over a first bulk material bed and its unloading opening is released, where the bulk material is delivered as long as required for the bulk material portion exchange, that is until the bulk material bed located under it again has reached its desired height of bulk material, or until the bulk material portion removal is completed, and the bulk material delivery container is moved along to another bulk material bed, where the unloading opening, of which there is at least one, is maintained closed if required, and the steps of bulk material portion delivery and the subsequent continued movement is repeated for additional beds, and after completion of the bulk material portion exchange, in particular for several beds, the bulk material delivery container is again moved into its charging position. Another method of the present invention involves treating, in particular cleaning, fluids, in particular gases, by means of at least one first bulk material (treatment agent I), in which the first bulk material is delivered to a fluid stream (entrainment stream), and entrained by the latter up to a filter, where it is retained on a filter surface, while the fluid flows through the filter, where the filter cake formed by the first bulk material on the filter is removed, at least partially, from time to time, and the fluid to be treated, which is mixed with the treatment agent I, is led, for post reaction and further treatment through a moving bed reactor which forms a bulk material bed made of a second bulk material (treatment agent II), in which the fluid substantially flows from the bottom to the top through the bulk material bed and the second bulk material substantially moves from top to bottom through the bulk material bed countercurrent with respect to the fluid, from which bulk material portions are removed from the lower end of the bulk material bed and in which bulk material portions are added at the top end of the bulk material bed, where, on the second bulk material and/or in the interparticle volume between its bulk material particles, the first bulk material or a fraction thereof deposits out of the fluid stream, and in that the fluid to be treated is optionally post reacted on the deposited first bulk material (treatment agent I) and further treated by means of the second bulk material (treatment agent II) in the moving bed reactor, and in that, with the bulk material portions, the first and second bulk material particles are removed together, at the lower end of the bulk material bed. One device of the present invention includes a bulk material delivery device that includes a bulk material delivery container, which can be moved on guides, and which container consists of a trough with closable unloading openings for bulk material, and which are arranged over the trough floor in a surface distribution or in a linear arrangement. Another device of the present invention is a fluid treatment installation, consisting of several bulk material beds which are arranged next to each other and can be operated in parallel, in which the fluid to be treated should flow substantially from the bottom to the top through a bulk material bed and the bulk material moves substantially from top to bottom through the bulk material bed countercurrent with respect to the fluid, by removing, at the bottom end of the bulk material bed, bulk material portions, and by applying, on the top end of the bulk material bed, bulk material portions to the bulk material bed, and the bulk material beds are interconnected by a shared horizontal charging channel and at least one bulk material delivery container can be moved through the charging channel between a charging position and several bulk material portion delivery positions above the bulk material beds.

Accordingly, the invention is based on the fundamental notion of using a bulk material delivery container inside or outside the reactor, which is loaded in a charging position with bulk material and which is moved over the different bulk material beds for the delivery of bulk material portions. In particular, this arrangement can be such that the bulk material delivery container is provided with at least one loading opening and at least one closable unloading opening, and, after loading with the bulk material, it is moved from the charging position over a first bed. There at least one unloading opening is cleared, and the unloading is continued until the bulk material bed located under it has again reached its desired height of bulk material, after, or at the same time as, the removal of a bulk material portion at the lower bed end. Then the unloading opening, of which there is at least one, is closed, and the bulk material delivery container is moved to another bed or into another loading position of the same bed. The process of bed refilling can then be repeated after the move to the next bulk material bed. Later, the bulk material delivery container returns to its charging position, for reloading with bulk material.

Advantageously, a bulk material delivery container has a width which corresponds to the width of the bulk material bed perpendicularly with respect to the direction of movement of the bulk material delivery container. The length of the direction of movement of the bulk material delivery container can be as large as the length of one or more of the bulk material beds to be refilled, or shorter, for example, it can be half as long or even shorter. Similarly, it is possible to provide the bulk material delivery container with a multitude of closable unloading openings distributed over its bottom. However, it is also possible to arrange the unloading openings next to each other in a single row, or to use a longitudinal slit as unloading opening, in particular it is possible to move the bulk material delivery container farther along in the travelling direction, or to stop only for a brief time in different positions, during the unloading process, so that the bulk material refilling occurs gradually from one bulk material bed edge to the opposite bulk material bed edge. In each case, bulk material can flow out of the bulk material delivery container through the opened unloading openings only until the bulk material layer located under it reaches the unloading opening of the bulk material delivery container and thus stops the continued flow of bulk material. If the bulk material delivery container is continuously moved along, or in increments, during the addition of bulk material portions to a certain bulk material bed, particularly desirable topographies on the bulk material bed surface can be achieved. In particular, it is possible to use relatively few unloading openings to produce a waviness having a comparatively small amplitude as surface contour of the bulk material bed, and the design of the bulk material delivery container can be correspondingly simple.

Just as the bulk material beds can be filled with a bulk material portion by moving the bulk material delivery container, which is open at the bottom, along the bulk material bed surface, it is possible to charge the bulk material delivery container by means of at least one charging container with linear formed charging opening, by moving the charging container and/or the bulk material delivery container in relative motion with respect to each other.

It is also possible to use several charging containers with linear charging opening, which containers are filled with different bulk materials, for example, one with an adsorption agent and another one with a chemical reactant. If the charging containers are successively moved relative to the bulk material delivery container and another bulk material layer is respectively deposited in the bulk material delivery container, the bulk material delivery container is thus filled with approximately parallel, in particular planar parallel layers of different fluid treatment agents. The same effect can be achieved if the bulk material delivery container moves, as it is filled, under a partitioned reservoir bin with adjacent outlet openings. Then planar parallel layers of different granulates on top of each other can be achieved. The layer thickness is here determined by the vertical separation between the reservoir bin outlet openings. If, during the bulk material portion exchange, the added quantity of bulk material is appropriately controlled, then at least one thin layer of each one of the bulk materials is transferred into the corresponding bulk material bed. As a result it becomes possible to achieve bulk material beds with a layered structure, where different gas treatment processes simultaneously occur in the beds, for example, adsorption processes and chemical conversion processes. It is also possible to move several bulk material delivery containers filled with different fluid treatment agents successively over the bulk material beds to achieve the same layering effect. Another possibility is to fill the same bulk material delivery container successively with various fluid treatment agents and to empty them over the same bulk material beds. A bulk material layer can also be structured as a mixture of different granulates.

It is clear from the above that a "fluid treatment" in the sense of the invention can be, among other possibilities, a chemical treatment, an absorptive cleaning treatment, and also a heat treatment. Heat treatments can be carried out, for example, by the introduction of heat energy carriers or by the generation of heat by a chemical reaction.

A gas treatment installation according to the invention for carrying out the method described above presents a horizontal charging channel, which is arranged above the bulk material beds and connects them to each other, so that the bulk material delivery container can be moved through the charging channel between a charging position and the bulk material delivery positions above the beds. Such a charging channel can be arranged above bulk material distribution floors, which in turn are arranged above each bulk material bed. The charging channel can be arranged outside of the reactor; it is preferred for it to be accommodated inside the reactor. It can replace the reservoir bins. The reservoir bins provided according to the state of the art for each bulk material bed can thus be combined above the bulk material distribution floors into a common horizontal charging channel. As a result, both the filling openings for the reservoir bins as well as the material abrading transport of the bulk material above the reactor cover, as known from the state of the art cited above, are omitted. In the same manner it is also possible to completely omit the bulk material distribution floors and to combine the gas collection spaces of adjacent bulk material beds into a horizontal charging channel. As a result, the construction height of the gas treatment installation is reduced even further. In such an arrangement, the bulk material delivery container can take over the function of throttle or closing flaps, which prevent the exit of treated gas out of a bulk material bed when the bulk material delivery container is located above the bulk material bed concerned and a bulk material portion refilling is carried out. This throttles or prevents the flow of the gas stream through the bulk material bed concerned, as desired in Patent WO 91/12069. Advantageously, in the present invention, the throttle or closing devices can be omitted, and their function is taken over by the bulk material delivery container.

The bulk material removal under each bulk material bed, as described in the state of the art mentioned above, can be carried out through funnels or, to achieve a lower construction height, by means of a conveyor belt. However, it is particularly advantageous if, below the bulk material delivery openings of the bulk material removal floors of the individual bulk material beds, a horizontal disposal channel is provided through which a longitudinal conveyor means for bulk material removal transport can be moved, which means is active for all connected bulk material beds. This means can be a conveyor belt. However, it is particularly advantageous to provide a bulk material reception container which extends—like the bulk material delivery container—over the entire bed width and which can be moved in the longitudinal direction of the bed. From the point of view of process technology it is particularly advantageous if both the bulk material delivery container and the bulk material reception container arrive at a position above and below the same bulk material bed. If bulk material delivery installations of the bulk material bed concerned are then opened or actuated, the bulk material which has been drawn off falls immediately into the bulk material reception container and fresh bulk material flows from above out of the bulk material delivery container onto the bulk material bed surface. As a result, a guarantee is provided that the full bed height is always maintained.

In all cases in which a shared disposal channel is provided below adjacent bulk material beds, only a single bulk material delivery location is required for the entire gas treatment installation or series of adjacent bulk material beds, so that comparatively few measures are required to prevent gas leaks. For the disposal channel—as for the charging channel—two possibilities of arrangement can again be implemented: in one arrangement, the disposal channel is provided, instead of bulk material delivery funnels, below the closed gas distribution space. In the other case, the disposal channel is arranged at a higher position, namely within the gas distribution spaces of the adjacent bulk material containers, which, for this purpose, are connected together to the disposal channel, while omitting lateral partitions. As a result, the installation height is further reduced, and the bulk material reception container can fulfill the function of a throttle or barrier means, by closing the gas inlet opening to the gas distribution space below the bulk material bed, or at least reducing its cross section, below which the bulk material reception container is located at that time, so that, at times of bulk material exchange, only small quantities of gas to be treated, or no gas at all, can flow into the bulk material bed located in the bulk material portion exchange.

The charging positions can also be provided at both ends of the process line, to have as small as possible a negative impact on the stream of gas to be treated. It is conceivable to move, in the charging position, the bulk material delivery container also vertically with respect to another stage for processing, for example, in a cycle over two levels. A particularly great advantage is achieved by a two-step, in particular a dry, fluid treatment process in which a treatment in the entrainment stream and a treatment in the moving bed, preferably with different treatment agents, are combined. In summary, the present invention pertains to a method for treating, in particular cleaning, fluids, in particular gases, on at least one bulk material, in which the fluid substantially flows from the bottom to the top through a bulk material bed and the bulk material moves through the bulk material bed substantially from top to bottom countercurrent to the fluid, and in which, at the bottom end of the bulk material bed, bulk material portions are removed and, at the top end of the bulk material bed, bulk material portions are delivered on the bulk material bed, where several bulk material beds are operated in parallel and, in particular, the bulk material portion exchange in the bulk material beds occurs substantially successively, in which the bulk material portion exchange for the delivery of bulk material portions onto the bulk material bed, a movable bulk material delivery container is used with a bulk material distribution arrangement for the even distribution in layers of the bulk material over the given bulk material bed with at least one loading opening and at least one closable unloading opening, and the movable bulk material delivery container is loaded in at least one charging position with bulk material, the bulk material delivery container is moved over a first bulk material bed and its unloading opening is released, where the bulk material is delivered as long as required for the bulk material portion exchange, that is until the bulk material bed located under it again has reached its desired height of bulk material, or until the bulk material portion removal is completed, the bulk material delivery container is moved along to another bulk material bed, where the unloading opening, of which there is at least one, is maintained closed if required, the steps of bulk material portion delivery and the subsequent continued movement is repeated for additional beds, and after completion of the bulk material portion exchange, in particular for several beds, the bulk material delivery container is again moved into its charging position. One additional and/or alternative feature of the method is that a movable bulk material reception container, such as a trough or a conveyor belt, is used and, in succession, moved under different bulk material beds for the bulk material portion reception and, finally, into a bulk material delivery position. Another additional and/or alternative feature of this method is that the bulk material delivery container and the bulk material reception container are respectively moved over and under the same bulk material bed, and the bulk material portion exchange quantity is determined by the bulk material portion which has been removed from the bed. Still another and/or alternative additional feature of this method is that the fluid stream to be treated is interrupted or throttled by the bulk material bed located in the bulk material portion exchange by means of the bulk material delivery container or by means of the bulk material reception container, or both. Yet another and/or alternative additional feature of this method is that the charging of the bulk material delivery container occurs in layers from different reservoir containers. Still yet another and/or alternative additional feature for this method is that the layers consist of at least one adsorbent, such as activated coke, and at least one substance for the chemical reaction of components from the fluid to be treated, for example, calcium hydroxide. A further and/or alternative additional feature of this method is that the charging of the bulk material delivery container is carried out by means of at least one slit opening or linear openings, and this opening and/or the bulk material delivery container is (are) moved relative to each other in the process. Still a further and/or alternative additional feature is a bulk material delivery device for carrying out the above one or more features in that a bulk material delivery container is provided, which can be moved on guides, which container consists of a trough with closable unloading openings for bulk material, which are arranged over the trough floor in a surface distribution or in a linear arrangement. Yet a further and/or additional feature of the device is that at least one charging container is provided with at least one linear or slit-shaped charging opening, and it can be moved for the surface loading of the bulk material delivery container relative to the latter. Another method of the present invention for treating, in particular cleaning, fluids, in particular gases, involves at least one first bulk material (treatment agent I) wherein the first bulk material is delivered to a fluid stream (entrainment stream), and entrained by the latter up to a filter, where it is retained on a filter surface, while the fluid flows through the filter, where the filter cake formed by the first bulk material on the filter is removed, at least partially, from time to time, and the fluid to be treated, which is mixed with the treatment agent I, is led, for post reaction and further treatment through a moving bed reactor which forms a bulk material bed made of a second bulk material (treatment agent II), in which the fluid substantially flows from the bottom to the top through the bulk material bed and the second bulk material substantially moves from top to bottom through the bulk material bed countercurrent with respect to the fluid, from which bulk material portions are removed from the lower end of the bulk material bed and in which bulk material portions are added at the top end of the bulk material bed, where, on the second bulk material and/or in the interparticle volume between its bulk material particles, the first bulk material or a fraction thereof deposits out of the fluid stream, and in that the fluid to be treated is optionally post reacted on the deposited first bulk material (treatment agent I) and further treated by means of the second bulk material (treatment agent II) in the moving bed reactor, and in that, with the bulk material portions, the first and second bulk material particles are removed together, at the lower end of the bulk material bed. In one apparatus of the present invention, a fluid treatment installation, consisting of several bulk material beds which are arranged next to each other and can be operated in parallel, in which the fluid to be treated should flow substantially from the bottom to the top through a bulk material bed and the bulk material moves substantially from top to bottom through the bulk material bed countercurrent with respect to the fluid, by removing, at the bottom end of the bulk material bed, bulk material portions, and by applying, on the top end of the bulk material bed, bulk material portions to the bulk material bed, and the bulk material beds are interconnected by a shared horizontal charging channel and at least one bulk material delivery container can be moved through the charging channel between a charging position and several bulk material portion delivery positions above the bulk material beds. One additional and/or alternative feature of this apparatus is that the charging channel, or an outflow channel running above said charging channel and/or an outflow channel running laterally with respect to the charging channel, forms (form) a shared gas collection space of the bulk material beds. Still another additional and/or alternative feature of this apparatus is that several bulk material beds are interconnected by a shared horizontal discharge channel and a bulk material reception container is movable through the discharge channel between the bulk material portion exchange positions (bulk material portion reception positions) and at least one bulk material delivery position below the bulk material beds. Yet an additional and/or alternative feature of this apparatus is that the discharge channel or a feed channel which runs under the discharge channel and/or laterally with respect to the discharge channel, forms a gas distribution space of the bulk material beds. Still yet another and/or additional feature of this apparatus is that the bulk material delivery container or the bulk material reception container, or both, is (are) provided with throttling means, such as closed lateral walls, which close off or throttle gas entry to the bottom of bulk material bed or gas exit to the exterior of the bulk material bed, located under or above the bulk material delivery/reception container. A further and/or additional feature of this apparatus is that the bulk material delivery container and/or the bulk material reception container consists of at least a series of funnel elements. Still a further and/or additional feature of this apparatus is that for the bulk material portion removal from the bulk material bed and fluid delivery into the bulk material bed, a flow path floor is used, in which at least first bulk material removal funnels, which are arranged next to each other or at least one first funnel-shaped bulk material removal channel is provided, and in which, in the lateral walls of each funnel or each channel, passage openings for the inflow fluid are arranged, and distributed over the funnel circumference or along the channel, and above each passage opening, a roof-shaped distribution element, which is open toward the bottom for flow impingement fluid, projects on the internal side of the funnel or the internal side of the channel from the lateral wall to the funnel interior or channel interior. Yet a further and/or additional feature of this apparatus is that it is designed as a longitudinal transfer channel (duct), optionally provided with one or more reversal loops, for the fluid to be treated between the fluid output end of a first reactor and the fluid uptake end of another reactor.

The above-mentioned process steps and construction components, to be used according to the invention, as well as those claimed and those described in the embodiment examples, are not subject to any special exceptional conditions with regard to their process conditions, their size, shape, material selection and technical design, so that the selection criteria in each application field can be applied without restriction.

Further details, characteristics and advantages of the object of the invention can be obtained from the following description of the associated drawing in which—as an example—preferred embodiment variants of the charging device and gas treatment installation are shown.

BRIEF DESCRIPTION OF THE DRAWINGS

FIG. 1*b* an enlarged representation of the right part of FIG. 1*a;*

FIG. 2*b* is a cross sectional view along line IIb—IIb according to FIG. 1*a;*

FIG. 6*a* is a perspective view of the installation portion as shown in FIG. 4*a;* and, FIG. 6*b* is a similar view as FIG. 6*a* but without bulk material delivery and bulk material reception container, and with a bulk material layer.

DESCRIPTION OF PREFERRED EMBODIMENT

Figure 1A:
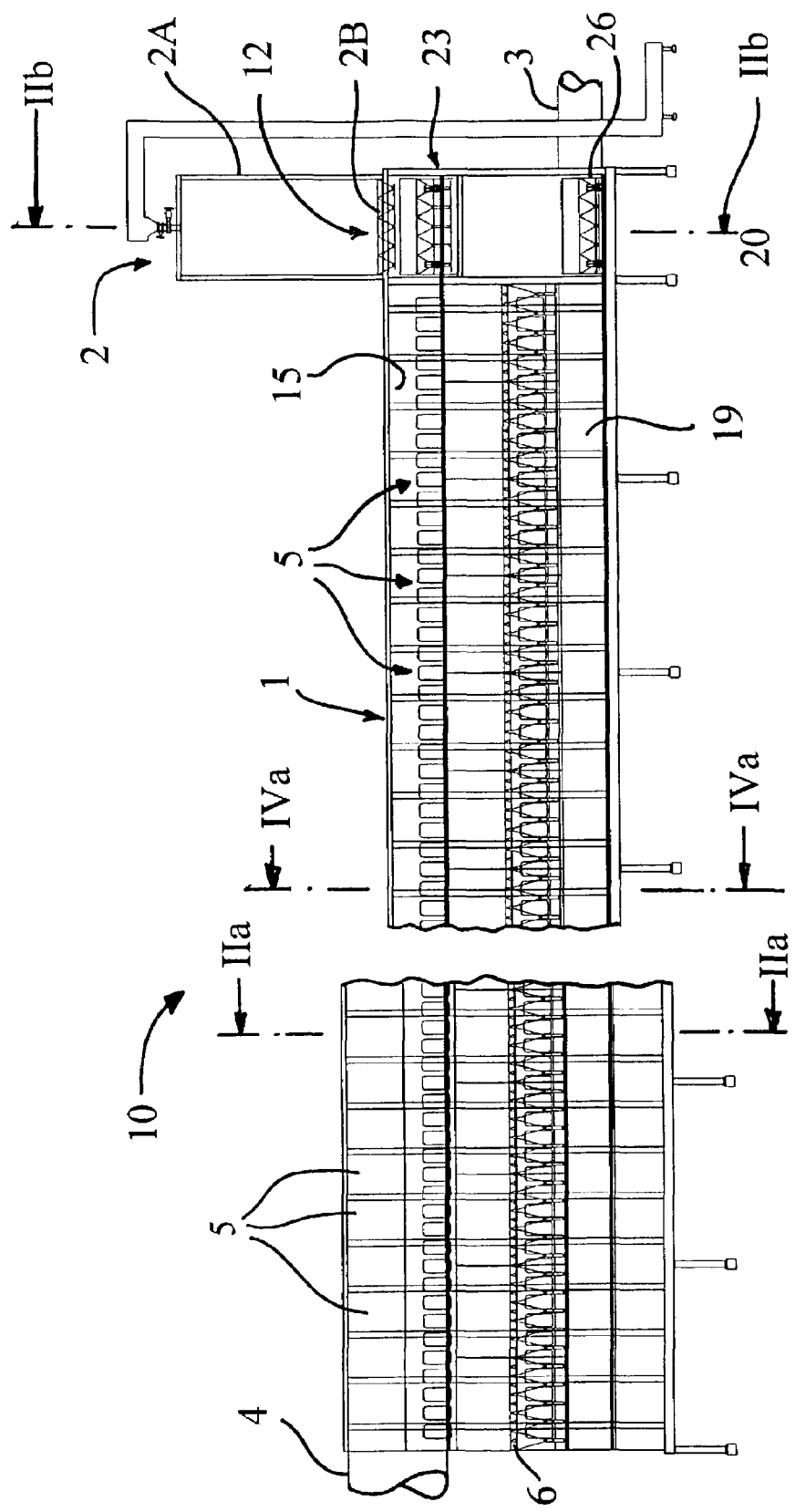
FIG. 1*a* shows a fluid treatment installation in longitudinal section.

In FIG. 1*a* a duct 1 can be seen, on whose right front end a charging station 2 and a gas inlet connector 3 are located, and on whose left end a gas outlet connector 4 is located, through which the fluid treatment installation 10, located inside the duct 1, can be supplied with the fluid to be treated, or the latter can be removed. The duct 1 can thus connect, in the fluid path, pre-connected or post-connected reactors, for example, the inlet side of a thermal reactor, such as a heat treatment installation, and, on the other hand, a post connected fluid treatment/cleaning step or a waste gas chimney. Depending on the existing space situations, the duct 1 can also present at least one fluid deflection location, so that the gas inlet connectors and gas outlet connectors can be arranged relatively close next to each other. It can have a design with horizontal or vertical meanders, or a design with several layers, that is several fluid deflection or distribution places, to take into account the given space situations. Thus, in a convenient manner, relatively large filter surfaces can be achieved, that is for treatment installations for exceptionally high fluid flow rates.

The duct 1, on its interior, is fitted with a multitude of moving bed reactor modules 5 arranged next to each other in the direction of the duct axis, which are separated from each other only by partitions made of metal sheet, which extend perpendicularly with respect to the reactor channel axis. Such moving bed reactor modules 5 are shown, for example, in FIGS. 6*a* and 6*b*, and they will be explained further in this connection.

Figure 4A:
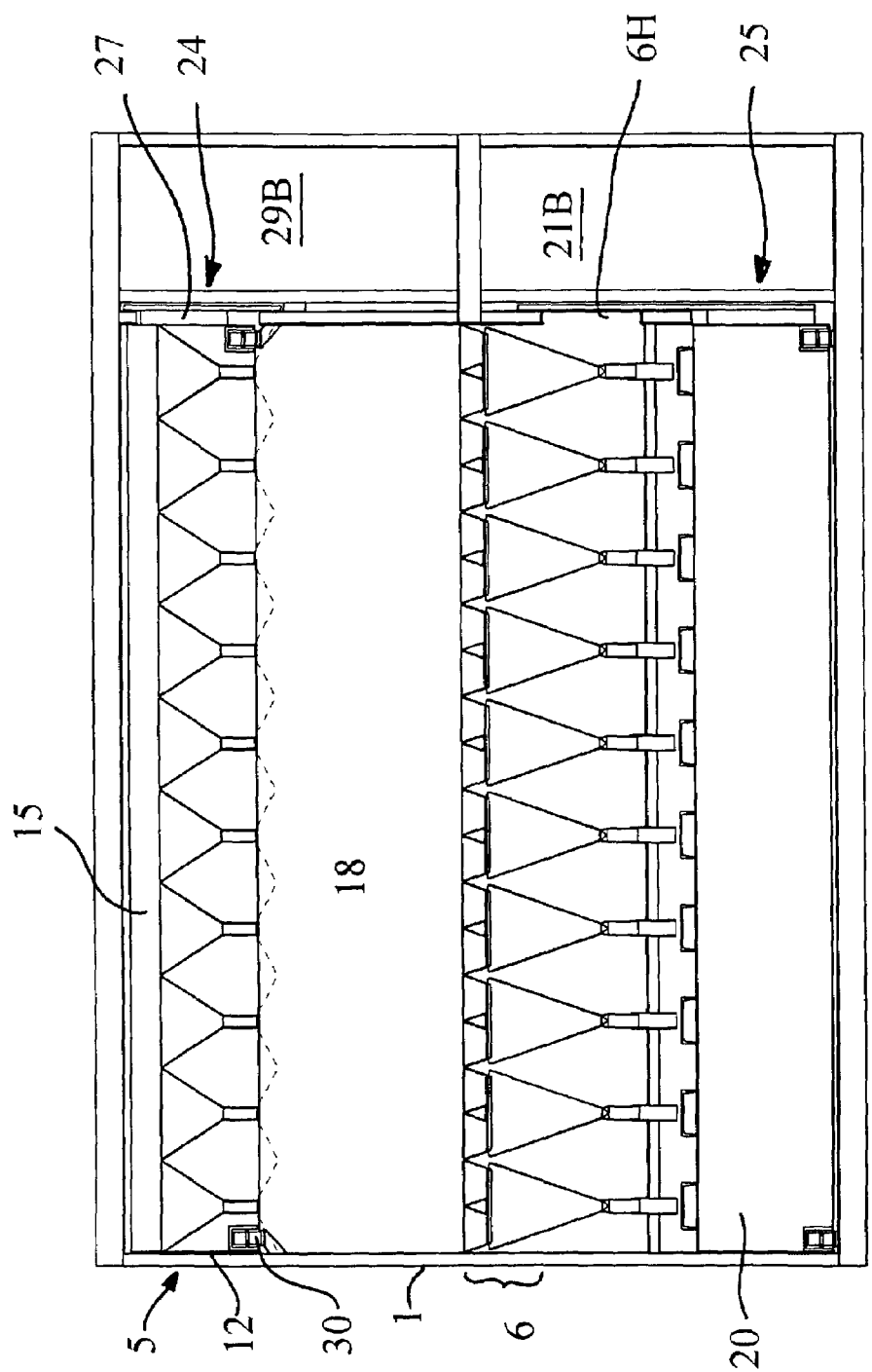
FIG. 4*a* is a cross sectional view along line IVa—IVa according to FIG. 1*a;*
Figure 4B:
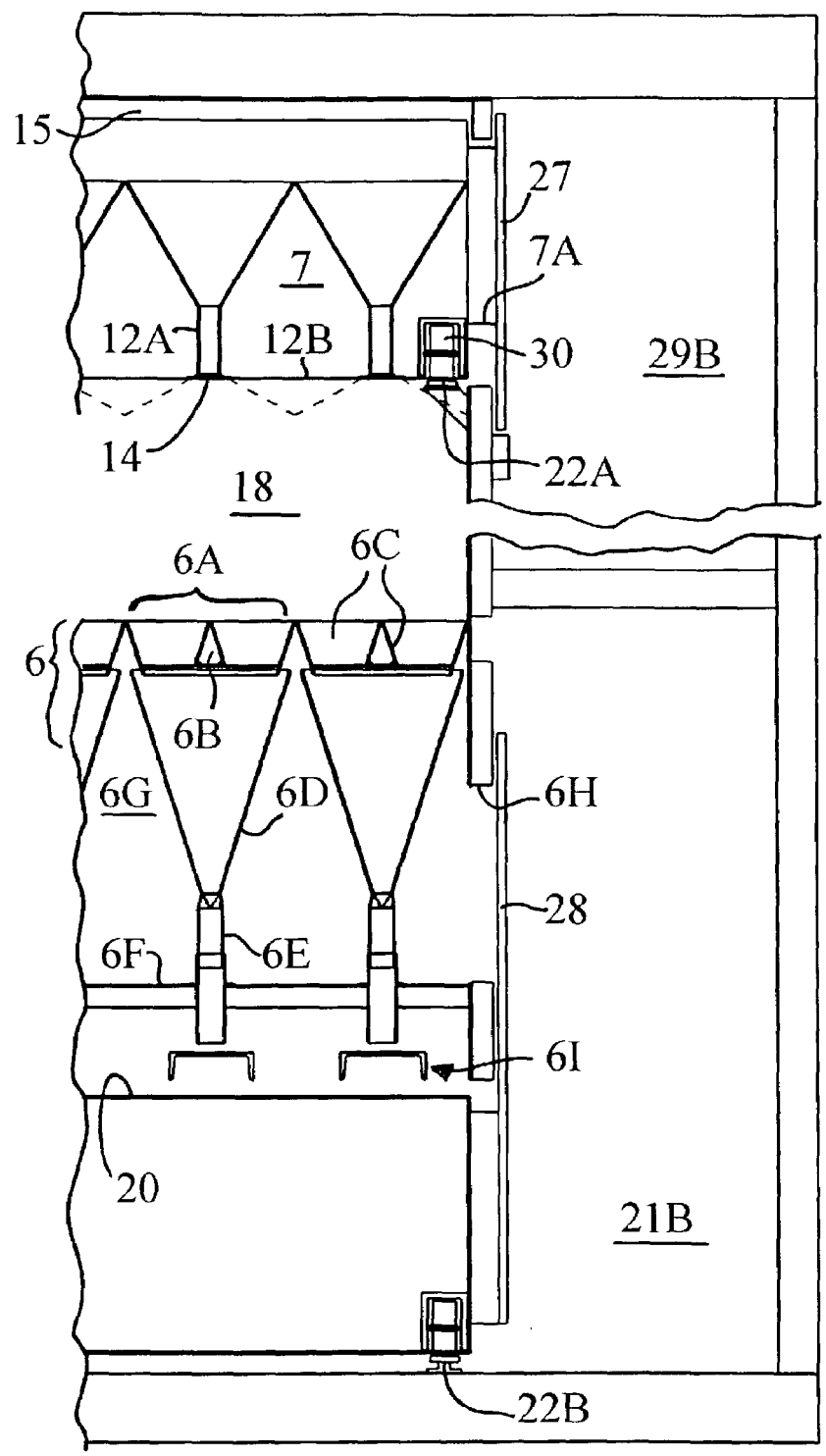
FIG. 4*b* is an enlarged sectional view of FIG. 4*a;*

With reference to FIGS. 4*a* and 4*b* as well, it will already be mentioned here that the moving bed reactor modules consist of the following components: a bulk material bed 18, of a particulate bulk material, for example, activated charcoal, a catalyst, calcium hydroxide and/or others. The bulk material bed has a base, which is, for example, square, and which is surrounded by lateral walls, and it has a bed height, for example, 1.2 m which is adapted to the treatment process. It rests on a so-called flow impingement floor 6, which, preferably, has the design known from European Patent No. 0 257 653 B1, that is which consists at least of first bulk material removal funnels 6A or funnel-shaped bulk material removal channels, which are arranged next to each other. Their lateral walls present passage openings 6B. Above the openings, roof-shaped distribution elements are located, which project from the funnel wall 6A to the funnel interior, and which allow the passage of the bulk material from the bottom and the entry of the fluid into the bulk material bed toward the top. An additional fluid inlet slit forms at the mouth circumference of the second bulk material removal funnel 6D, which follows in the downward direction immediately after the outlet opening of the first bulk material removal funnel 6A with circumferential slit. Bulk material outlet pipes 6E, which follow in the downward direction after the second bulk material removal funnel 6D, and which can be designed so they can be telescoped, for thermal and mechanical reasons, penetrate through a dust cover 6F in the form of a cross section filling floor. This floor 6F, the bulk material removal funnel 6A/6D, as well as the external holding walls, comprise a fluid distribution space 6G below the bulk material bed 18. A lateral feed channel 21B, which extends next to a lateral wall of the fluid distribution space 6G, preferably inside of the duct 1, parallel to its longitudinal axis, leads the fluid to be treated along the entire duct 1. Since all the fluid distribution spaces 6G are provided with a feed inlet window 6H in the partition leading to the immediately adjacent feed channel 21B, each moving bed reactor module of the duct can be evenly supplied with the fluid to be treated, and, the sufficiently large flow cross sections ensure that the pressure loss in all bulk material beds is practically identical.

Below the dust cover 6F, under each bulk material outlet pipe 6E, a cycling, horizontally movable, bulk material delivery device 6I is arranged. In principle, its structure can be as desired, for example, as described in greater detail in EP 0 357 653 B1.

Above each bulk material layer 18, a gas collection space 7 is located which has a lateral outflow window 7A for fluid connection with an outflow channel 29B for treated fluid. The latter extends along the duct 1 over its entire length.

Figure 3:
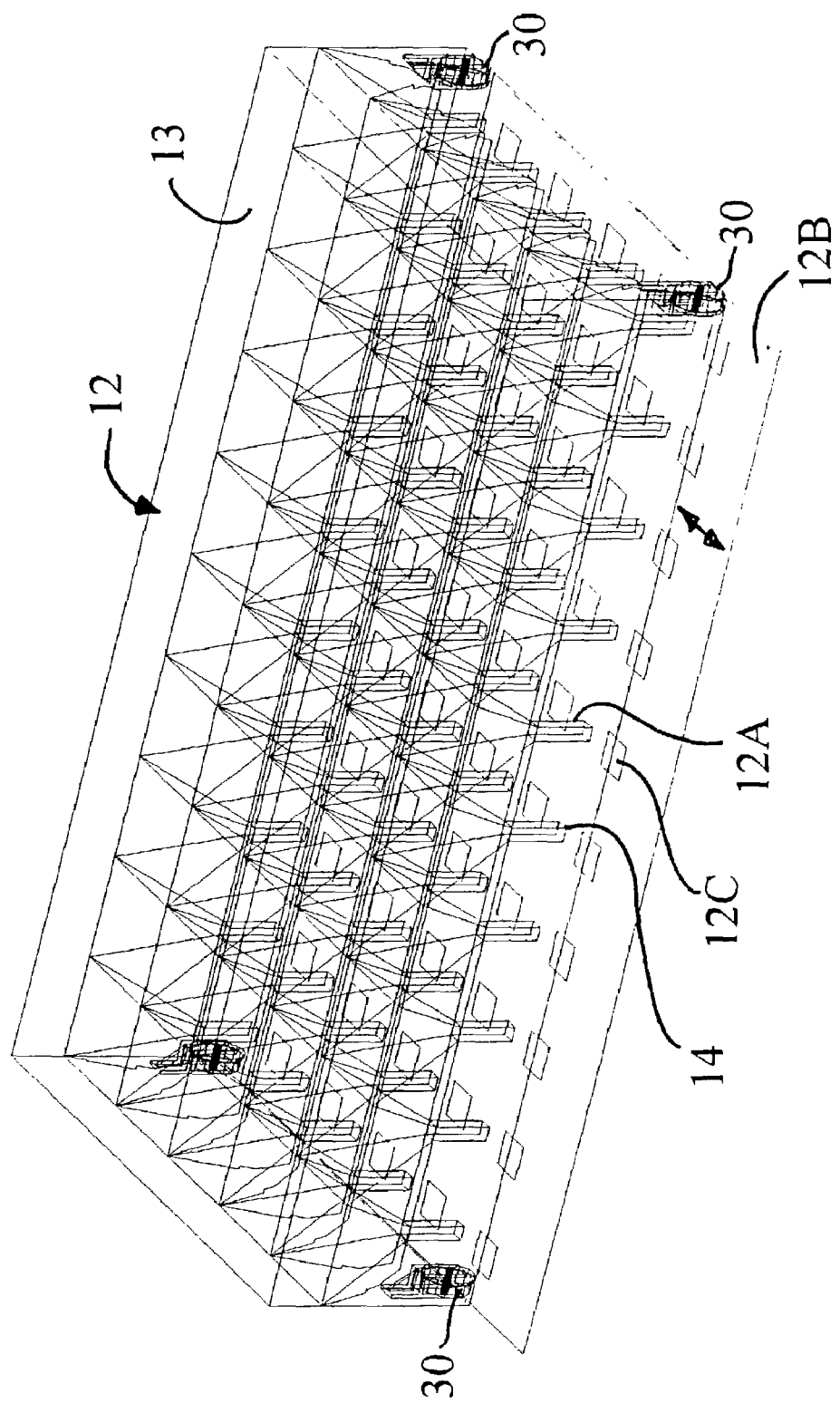
FIG. 3 is a perspective view of a movable bulk material delivery container in perspective representation.

As can be better seen in FIG. 3, a bulk material delivery container 12 is provided, which can be moved along guides 22A by means of a simple carriage 30 inside the duct parallel to the duct axis. In the embodiment example shown, the bulk material delivery container 12 presents the same cross section as each moving bed reactor module 5. To allow the movement of each bulk material delivery container 12 between the charging station 2 and all the bulk material beds 18 to be supplied by it, all moving bed reactor modules can be connected to each other by a charging channel 15 parallel to the duct axis. See especially FIGS. 6a and 6b.

The bulk material delivery container 12 is further explained with reference to FIGS. 3–6a. It consists of a flat trough with a multitude of closable unloading openings 14 in the form of mouth openings of bulk material funnels, distributed over a surface area, with bulk material exit pipes 12A. The bottom of the flat trough, that is of the bulk material delivery container 12, corresponds to the type and arrangement of a bulk material distribution floor which is arranged as a stationary bulk material distribution device between the bulk material reservoir bin and the bulk material bed located under it, and which is already known from EP 0 357 653 B1. The difference compared to the known state of the art consists in that this bulk material distribution floor presents an enclosing frame with a carriage, and is thus designed as a movable conveyance. Below the outlet mouths of the bulk material exit pipes 12A, a baffle 12B which extends over the entire cross section is located with a distribution and size of bulk material passage openings 12C corresponding to the arrangement of the bulk material exit pipe 12A. In the perspective view of FIG. 6a, a front wall and a part of the baffle of the movable bulk material delivery container 12 have been omitted for clarity's sake.

A special feature of the bulk material delivery container 12 consists of one, optionally additional, lateral wall which serves as a throttle means 27 (FIG. 4a/4b) for closing the outflow window 7A. This plate, which is also set in motion by the bulk material delivery container 12 prevents, in the area in which the bulk material delivery container 12 is located at the time, the transfer of treated fluid from the gas collection space 7 into the continuous outflow channel 29B. As a result, separate closing or throttle valves for each individual outflow window 7A can be omitted.

The mechanism of operation of the bulk material delivery container 12 is such that it is loaded with bulk material in the charging position 23 represented in FIG. 1a and then moved in each case over the bulk material bed 18 which requires a bulk material exchange. Except during the bulk material portion exchange, the delivery device, such as the baffle 12B, remains closed.

The charging process which takes place in the charging station 23 can occur in a varying manner. In the embodiment variant represented in FIG. 1a, a reservoir bin 2A for bulk material with a closed bulk material delivery floor 2B is provided. By means of the latter, the movable bulk material delivery container 12 is filled with fresh bulk material from the reservoir bin 2A.

Figure 5:
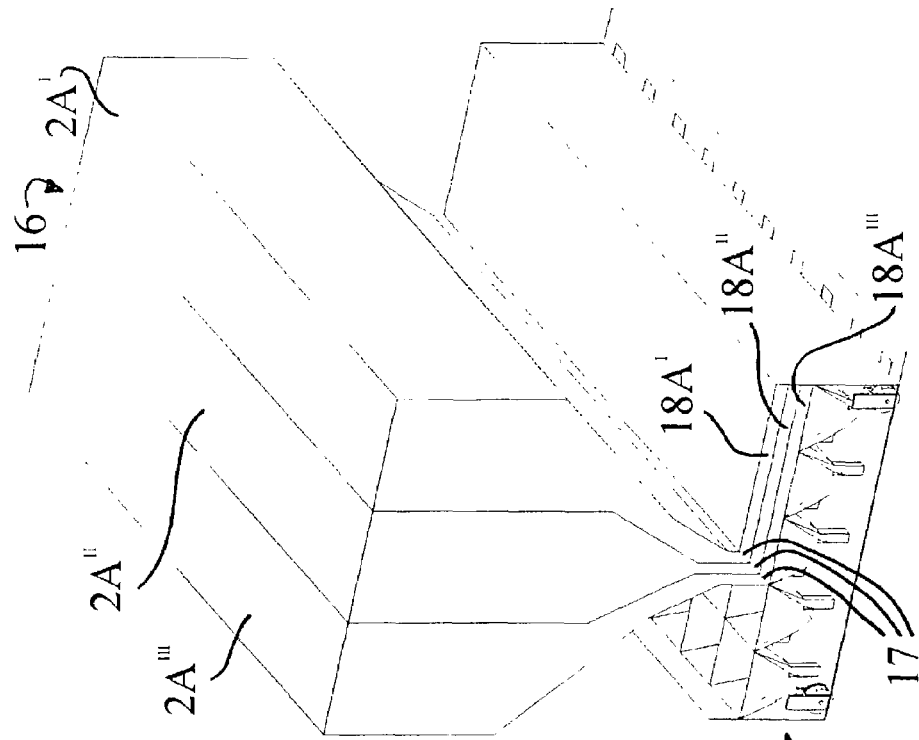
FIG. 5 is a perspective view of a bulk material delivery container with a charging container.

Alternatively, the charging process can occur in the manner shown in FIG. 5. Here the reservoir bin 2A has at least one, in the embodiment example three, bulk material exit slits at the lower end, and reservoir bins and/or bulk material delivery containers can be moved relative to each other in the direction of the duct axis. As a result a bulk material layer can be filled from one end to the other end of the bulk material delivery container (in the direction of movement). In the embodiment example shown, the reservoir bin is designed as a movable charging container 16 and subdivided into partial bunkers 2A', 2A" and 2A'". Each can be filled with a different bulk material. The delivery slits (charging openings 17) are located at varying depths, so that bulk material layers 18A', 18A", 18A'" are formed in the movable bulk material delivery container 12.

The bulk material portion exchange occurs in a manner which in itself is known, namely by shifting the bulk material delivery device 6I of the flow impingement floor 6 (FIG. 4a) horizontally, releasing the bulk material pipe mouths, while, above the bulk material bed 18, the bulk material delivery container 12 is stationed with opened bulk material exit pipes 12A. The bulk material, depending on the actuation of the bulk material delivery installation 6I, automatically continues to fall from the top to the bottom so that fresh bulk material automatically follows from above.

The removal of the delivered bulk material can occur in any manner. It is preferred to use a movable bulk material reception container 20, which can have fundamentally the same construction design as the bulk material delivery container 12. Such an example was used in the figures. A continuous disposal channel 19, formed in the duct 1, allows the bulk material reception container 20 to be moved in a position which extends beyond that of the adjacent moving bed reactor modules. This is emptied in the bulk material delivery position 26 shown in FIG. 1a.

An additional special feature of the movable bulk material reception container 20 is a lateral wall which is designed as a throttling agent 28 which (as in the bulk material delivery container 12) is moved along, and which closes or throttles the fluid passage through the given flow impingement window 6H of the moving bed reactor module under which the bulk material reception container 20 is located. As a result, special adjustment valves are avoided.

Figure 2A:
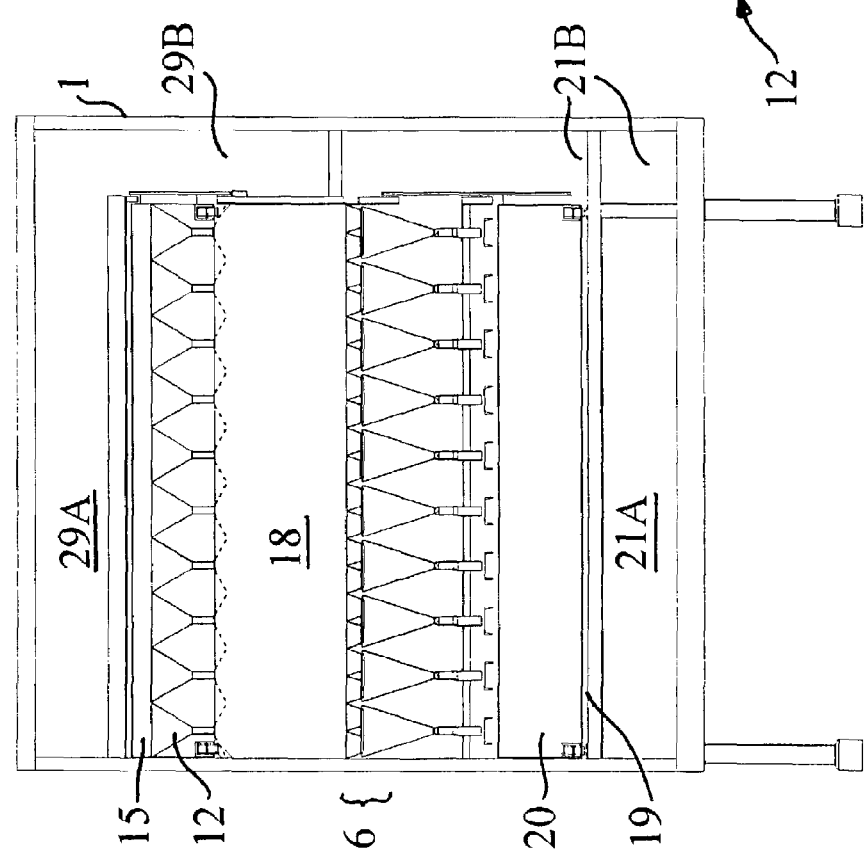
FIG. 2*a* is a cross sectional view along line IIa—IIa according to FIG. 1*a;*

A particularly advantageous, alternative way of using heat for the arrangement of the inlet and outlet channels to and from the moving bed reactor modules along duct 1 is shown in FIG. 2a. Here a top outflow channel 29A and bottom feed channel 21A were added to the lateral inlet and outlet channels 21B, 29B, whose cross section, however, can now be smaller. These top and bottom channels are in fluid connection over the entire length, so that the principal portion of the inflowing fluid, that is the fluid to be treated, can flow out from under the flow impingement floor and the principal portion of the outflowing fluid, that is the fluid to be treated, can flow out above the bulk material beds. The reactor floor and reactor cover, for example, the duct floor and the duct roof are thus heated and replace the accompanying heating used conventionally so far.

The fluid treatment installation according to the invention allows an economic fluid treatment, especially of extremely large fluid quantities, for example, several hundred thousands or millions of $m^3$ of gas per hour.

In a particularly advantageous fluid treatment method the treatment of fluid takes place on two solid bulk materials, combined in an entrainment stream with post connected moving bed, where the moving bed serves as filter and as post reaction stage for the first finely divided bulk material released into the fluid stream and also as the second treatment step. In particular, the fluids in particular gases are treated by means of at least one first bulk material (treatment agent I), in which the first bulk material is delivered to a fluid stream (entrainment stream), and entrained by the latter up to a filter, where it is retained on a filter surface, while the fluid flows through the filter, where the filter cake formed by the first bulk material on the filter is removed, at least partially, from time to time, and the fluid to be treated, which is mixed with the treatment agent I, is led, for post reaction and further treatment through a moving bed reactor which forms a bulk material bed made of a second bulk material (treatment agent II), in which the fluid substantially flows from the bottom to the top through the bulk material bed and the second bulk material substantially moves from top to bottom through the bulk material bed countercurrent with respect to the fluid, from which bulk material portions are removed from the lower end of the bulk material bed and in which bulk material portions are added at the top end of the bulk material bed, where, on the second bulk material and/or in the interparticle volume between its bulk material particles, the first bulk material or a fraction thereof deposits out of the fluid stream, and the fluid to be treated is optionally post reacted on the deposited first bulk material (treatment agent I) and further treated by means of the second bulk material (treatment agent II) in the moving bed reactor, and the first and second bulk material particles are removed together, at the lower end of the bulk material bed. In known methods for a single step treatment, particularly for the cleaning of fluids, in particular gases, with at least one bulk material in the entrainment stream, it is conventional to distribute the first bulk material in an entrainment stream generated by the fluid, and to allow it to be entrained in the latter into a cloth filter where it is retained, while the fluid flows through the cloth filter. A fluid treatment installation according to the invention, in contrast, works in two steps, where, as filter for the entrainment stream step, a moving bed reactor which presents a bulk material bed as filter surface, is used. The latter can be used not only as post reaction step for the (first) entrainment stream step, it also represents a second treatment step. In the latter step, the fluid flows through a bulk material bed from the bottom to the top, and a second bulk material which forms the bulk material bed moves, in countercurrent to the fluid, through the moving bed reactor from top to bottom. At the bottom end of the bulk material bed, bulk material portions are removed, and at the top end of the bulk material bed they are delivered. On the second bulk material, that is the bulk material of the bulk material bed, and in the inter grain volume between its bulk material particles, the first bulk material or a fraction thereof settles out of the fluid stream. Jointly with the bulk material portions to be delivered, the consumed first and second bulk materials are removed at the bottom end of the bulk material bed. This method can naturally also be used advantageously if the filling of the moving bed reactor occurs via stationary storage bunkers and not via the movable bulk material delivery containers according to the invention.

This method opens a completely new dimension in entrainment stream technology, allowing a more complex treatment of gases with finely divided bulk materials in an entrainment stream as well as their separation. Indeed, in both cases, the problem is that a so-called filter cake, which continuously increases, forms on the filter. This gradually increases the pressure drop. In addition, the residence time of the gas to be filtered in the filter cake gradually increases. Because, after a certain time, the pressure drop in the filter cake becomes too large, the filter cake must be removed and then reconstructed. This is a costly procedure and leads to discontinuities in fluid treatment. Both problems are prevented by the bulk material filters according to the invention which is designed as a moving bed reactor, because the treatment particles from the sent in fluid are deposited in the inlet zone of the bulk material bed, that is at a place where the bulk material is continuously or nearly continuously removed from the moving bed reactor. As a result the filtration performance remains relatively constant, so that the above-mentioned discontinuities are largely avoided. Thus, a continuously self cleaning filter is achieved here, whose filter cake thickness remains almost constant, and which practically never needs to be cleaned.

A special advantage of this method consists in that the (second) bulk material particles of the moving bed reactor are used for additional fluid treatment steps. Thus it was possible, for example, to add as first bulk material to a fluid stream to be treated, together with the formation of the fluid stream, activated charcoal, by means of which an adsorptive gas cleaning can be carried out, where the latter takes place in part in the entrainment stream phase and in part when this activated charcoal is collected in the moving bed reactor. In this process, the penetration depth of the particles of the first bulk material in the bulk material bed can be influenced by control of the bulk material portion exchange.

The second bulk material particles can consist, for example, of adsorbents, such as calcium hydroxide, NaOH or another solid particulate material suitable for treatment of fluid for the chemical treatment of inorganic toxins, such as HCl, $SO_2$, etc. As bulk material for the movement bed reactors one can use, among others, a granulate made of brown coal, stone coal, limestone and/or sorbalite, which again can also be present in layers in the bulk material bed, which is allowed by the bulk material transport conveyance (bulk material delivery container).

In addition, it is understood that the bulk materials which are delivered from the moving bed reactor modules, can also be delivered separately by bulk material type and be reused, if their fluid treatment capacity has not been completely consumed.

EXAMPLE 1

A gas is to be cleaned of gaseous toxic components, which, at least in part, do not lend themselves particularly well for adsorptive binding, for example, HCl, whose separation is to be improved, in comparison to other toxins present in the waste gas, such as heavy hydrocarbons. For this purpose a compound, for example, an alkaline compound, in particulate form (first bulk material) is added to the waste gas with the formation of the entrainment stream cloud. As a result of the addition of, for example, calcium hydroxide ($Ca(OH)_2$) as alkaline compound, calcium chloride ($CaCl_2$) is produced by a chemical reaction with the HCl. The $Ca(OH)_2$, whose particle sizes are, for example, in the μm range, deposits on the surface of the granulate particles (second bulk material) in the bulk material of a countercurrent moving bed reactor of the type represented in the figure. Since this deposit is concentrated on the area of the flow impingement floor of the countercurrent moving bed reactor, the, optionally chemically modified, particles of the first bulk material are delivered together with the granulate particles of the bulk material bed in layers, from the countercurrent bed reactor.

The metered addition of the first bulk material with the formation of the entrainment stream cloud generated by the waste gas to be treated is usually carried out with fixed cycle operation but it can also be carried out continuously. By the fixed-cycle metered addition, a particularly high chemical conversion rate, for example, of the $Ca(OH)_2$ is achieved. As a result, the operating costs are reduced.

The waste gas which is to be cleaned, and which generates the entrainment stream, can originate, for example, from the combustion of biogases or liquid or gaseous chlorine containing residual substances in which no or only very little solid extraneous material in the form of dust is contained or produced. In these cases, the metered addition of the first bulk material can be carried out particularly intensively under formation of the entrainment stream cloud.

If the pressure loss increase in the countercurrent moving bed reactor is used as control parameter for the delivery of the granulate/particle mixture, then it is possible that the full load capacity of granulate for heavy hydrocarbons or other toxins to be cleaned from the waste gas will not be completely consumed (this can naturally also be the case for the particles of the entrainment stream cloud). In such cases, the particles (the first bulk material) can be separated from the granulate (second bulk material) after removal from the countercurrent moving bed reactor and it can be recycled, depending on usability, in circulation in the two-step cleaning process.

EXAMPLE 2

In sintering processes, one uses cost-effective coke as fuel, among other materials. The coke can be used, before combustion on the sintering belt, as an adsorbent in the countercurrent moving bed reactor to achieve the adsorptive cleaning of toxins from waste gases from the sintering process, for example, dioxins, furans, uncombusted heavy hydrocarbons, mercury and other compounds. Because the coke used for this purpose, which functions as heat source due to combustion later in the sintering process, does not present particularly good adsorptive properties for waste gas cleaning in the countercurrent moving bed reactor, the required pure gas concentration of the purified waste gas may not be reached, for example, with regard to dioxins and furans, if these toxins occur in particularly high concentrations in the waste gas to be cleaned. In such a case, an entrainment stream cleaning step immediately precedes the countercurrent moving bed adsorber. In this entrainment stream step, an absorbent of comparatively higher quality is blown into the waste gas to be cleaned. For this purpose, it can be sufficient to use a partial quantity of the mentioned coke, but it is better to use a high quality active coke in ground form, that is with relatively smaller particle sizes than the coke granulate. In this entrainment stream cloud, a portion of the toxins is then adsorbed to the finely divided adsorbent-namely immediately in the entrainment stream phase, and also after the deposition in the entry area of the bulk material bed of the countercurrent moving bed reactor (post reaction). The remaining waste gas cleaning occurs in the conventional manner on the particulate coke in the countercurrent moving bed reactor.

Since relatively large quantities of coke are combusted in such sintering processes, a relatively large amount of second bulk material is available for the bulk material bed of the countercurrent moving bed reactor, so that the separation of toxins and the pressure loss, as well as the metered addition of finely divided adsorbents in the entrainment stream can be adjusted to each other and optimized. While preferred particle sizes of the coke granulates are in the range of 2–6 mm, the particle sizes of particles for the entrainment stream are clearly smaller. Therefore, it is also conventional to first sieve the raw coke, and to use a sieve cross section of more than 2 mm for the countercurrent moving bed reactor and the fine particle portion or parts of the fine particle portion for the cleaning in the entrainment stream.

I claim:

1. A method of treating fluids by use of at least one bulk material comprising:
  a. flowing a fluid substantially through a plurality of bulk material beds, said fluid flowing from a bottom to a top of at least one bulk material bed;
  b. moving said at least one bulk material in at least one of said bulk material beds countercurrent to the flow of said fluid through at least one of said bulk material beds;
  c. delivering said at least one bulk material via a movable bulk material delivery mechanism for at least partially adding said at least one bulk material to said top of said at least one bulk material bed, moving said bulk material delivery mechanism, and then adding said at least one bulk material to a top of another bulk material bed wherein said movable bulk material delivery mechanism is movable to a plurality of said bulk material beds so as to provide substantially even distribution of said at least one bulk material over a given bulk material bed until said at least one bulk material in said at least one bulk material bed has been properly exchanged;
  d. operating said plurality of said bulk material beds in parallel such that said removing and said adding of said at least one bulk material in said plurality of said bulk material beds occurs successively; and,
  e. said at least one bulk material bed includes a loading opening adapted to receive said at least one bulk material into said top of said bulk material bed, and at least one closeable unloading opening to controllably remove said at least one bulk material from said bottom of said at least one bulk material bed.

2. The method as defined in claim 1, wherein said at least one bulk material bed has been properly exchanged with said at least one bulk material when said at least one bulk material has reach a desired height in said at least one bulk material bed or until a desired amount of said at least bulk material has been removed and replenished in said at least one bulk material bed.

3. The method as defined in claim 2, wherein said at least one bulk material bed has been properly exchanged with said at least one bulk material by at least partially removing said at least one bulk material from said bottom of said at least one bulk material bed while said at least one bulk material is at least partially added to said top of said at least one bulk material bed.

4. The method as defined in claim 2, wherein said at least one bulk material bed has been properly exchanged with said at least one bulk material by at least partially adding said at least one bulk material to said top of said at least one bulk material bed without removing said at least one bulk material from said bottom of said at least one bulk material bed.

5. A method of treating fluids by use of at least one bulk material comprising:
  a. flowing a fluid substantially through a plurality of bulk material beds, said fluid flowing from a bottom to a top of at least one bulk material bed;
  b. moving said at least one bulk material in at least one of said bulk material beds countercurrent to the flow of said fluid through at least one of said bulk material beds;
  c. at least partially adding said at least one bulk material to said top of said at least one bulk material beds so as to provide substantially even distribution of said at least one bulk material over a given bulk material bed until said at least one bulk material in said at least one bulk material bed has been properly exchanged;
  d. operating a plurality of said bulk material beds in parallel such that said removing and said adding of said at least one bulk material in a plurality of said bulk material beds occurs successively;

e. said at least one bulk material bed includes a loading opening adapted to receive said at least one bulk material into said top of said bulk material bed, and at least one closeable unloading opening to controllably remove said at least one bulk material from said bottom of said at least one bulk material bed;

f. including a movable bulk material delivery mechanism to at least partially deliver said at least one bulk material to said plurality of said bulk material beds, wherein the movable bulk material delivery mechanism moves from said top of said at least one bulk material bed and then to a top of another bulk material bed;

g. said movable bulk material delivery mechanism includes a container, said container including a plurality of slit openings or linear openings that are used to at least partially deliver said at least one bulk material to said plurality of said bulk material beds; and, h. said container is movable on guides, and said container includes a trough with closeable unloading openings which are arranged over a trough floor in a surface distribution.

6. The method as defined in claim 5, further including at least partially replenishing said movable bulk material delivery mechanism with said at least one bulk material after said movable bulk material delivery mechanism has at least partially delivered said at least one bulk material to at least one of said plurality of said bulk material beds.

7. The method as defined in claim 1, including a movable bulk material reception mechanism wherein said movable bulk material reception mechanism conveys at least a portion of said at least one bulk material to said movable bulk material delivery mechanism.

8. The method as defined in claim 1, including a movable bulk material reception mechanism wherein said movable bulk material delivery mechanism and said moveable bulk material reception mechanism are respectively moved over and under the same bulk material bed, and an amount of said at least one bulk material delivered to said bulk material bed is at least partially determined by an amount of said at least one bulk material portion which has been removed from said bulk material bed.

9. The method as defined in claim 7, wherein said flow of said fluid is interrupted or throttled by said movable bulk material delivery mechanism and/or said moveable bulk material reception mechanism.

10. The method as defined in claim 5, including a plurality of sources to supply said at least one bulk material to said movable bulk material delivery mechanism.

11. The method as defined in claim 5, wherein said movable bulk material delivery mechanism supplies at least two different bulk materials to said at least one bulk material bed.

12. The method as defined in claim 1, wherein said bulk material bed includes a plurality of different types of bulk material.

13. The method as defined in claim 12, wherein at least two different types of bulk material are substantially layered in said bulk material bed.

14. The method as defined in claim 12, wherein at least two different types of bulk material include at least one adsorbent and at least one chemically reactive component.

15. The method as defined in claim 14, wherein said at least one adsorbent includes activated coke, and said at least one chemically reactive component includes calcium hydroxide.

16. A method for treating fluids by at least one type of bulk material comprising:

a. introducing a first bulk material having a first treatment agent in a fluid stream;

b. entraining said first bulk material on a filter as said fluid flows through the filter;

c. removing a filter cake formed by said first bulk material on said filter;

d. at least partially treating said fluid with said first bulk material in a moving bed reactor, said moving bed reactor including a bulk material bed at least partially formed of a second bulk material having a second treatment agent, said fluid substantially flowing from a bottom to a top of said bulk material bed and said second bulk material substantially moving from the top to the bottom of said bulk material bed, e. adding said second bulk material to said top of said bulk material bed and removing said second bulk material from said bottom of said bulk material bed, said adding said first and said second bulk material includes a movable bulk material delivery mechanism to at least partially deliver at least said first bulk material to a plurality of said bulk material beds wherein the movable bulk material delivery mechanism moves from a top of one bulk material bed and then to a top of another bulk material bed; and, f. at least partially separating said first bulk material from said fluid in said bulk material bed.

17. The method as defined in claim 16, wherein fluid is post reacted with said first bulk material and further treated by said second bulk material as said fluid flow through said moving bed reactor.

18. The method as defined in claim 16, wherein said first and said second bulk materials are removed together at said bottom of said bulk material bed.

* * * * *